(12) United States Patent
Li et al.

(10) Patent No.: US 10,019,952 B2
(45) Date of Patent: Jul. 10, 2018

(54) LIQUID CRYSTAL ON SILICON DISPLAY WITH BRIGHTNESS ADJUSTMENT

(71) Applicant: Himax Display, Inc., Tainan (TW)

(72) Inventors: Kuo-Jung Li, Tainan (TW); Mao-Jung Chung, Tainan (TW)

(73) Assignee: Himax Display, Inc., Tainan (TW)

( * ) Notice: Subject to any disclaimer, the term of this patent is extended or adjusted under 35 U.S.C. 154(b) by 147 days.

(21) Appl. No.: 15/210,908

(22) Filed: Jul. 15, 2016

(65) Prior Publication Data

US 2018/0018925 A1      Jan. 18, 2018

(51) Int. Cl.
*G09G 3/34* (2006.01)
*G02F 1/1335* (2006.01)
*G02F 1/1368* (2006.01)
*G09G 3/36* (2006.01)
*G02F 1/1362* (2006.01)

(52) U.S. Cl.
CPC ......... *G09G 3/3413* (2013.01); *G02F 1/1368* (2013.01); *G02F 1/133514* (2013.01); *G02F 1/133528* (2013.01); *G02F 1/136277* (2013.01); *G09G 3/3648* (2013.01); *G02F 2001/13355* (2013.01); *G09G 2320/0626* (2013.01); *G09G 2320/0666* (2013.01)

(58) Field of Classification Search
CPC ......... G09G 3/3413; G09G 2320/0626; G09G 2320/0666; G09G 2320/0686; G09G 2320/0633; G09G 2302/04; G09G 3/3648; G02F 1/136277; G02F 2001/13355

See application file for complete search history.

(56) References Cited

U.S. PATENT DOCUMENTS

2007/0252918 A1    11/2007  Furuya et al.
2011/0193896 A1*   8/2011   Johnson .................. G06T 5/009
                                                                     345/690
2016/0037147 A1    2/2016   Kempf et al.

FOREIGN PATENT DOCUMENTS

TW            501079 B       9/2002
TW          201113866 A1     4/2011

* cited by examiner

*Primary Examiner* — Larry Lee
(74) *Attorney, Agent, or Firm* — CKC & Partners Co., Ltd.

(57) ABSTRACT

The liquid crystal on silicon (LCoS) display includes a polarization beam splitter (PBS), a light source, a LCoS panel and a gain control circuit. The PBS has a first side and a second side. The light source is disposed at the first side of the PBS. The gain control circuit receives brightness values. Each of the brightness values has a coordinate which is based on a coordinate axis extending from the first side of the PBS to the second side. The coordinate of a first brightness value is less than the coordinate of a second brightness value. The gain control circuit determines gains according to the coordinates, and adjusting the brightness values according to the gains, in which the gain of the first brightness value is less than the gain of the second brightness value.

4 Claims, 5 Drawing Sheets

LIQUID CRYSTAL ON SILICON DISPLAY WITH BRIGHTNESS ADJUSTMENT

BACKGROUND

Field of Invention

The present invention relates to a liquid crystal on silicon display, yore particularly, the present invention relates to the liquid crystal on silicon display with brightness adjustment.

Description of Related Art

Liquid Crystal on Silicon (LCoS) is a reflective projection display. The LCoS display has the advantages of low-cost, high aperture ratio (up to 90%), and high resolution. In general, the LCoS display Includes a light source, a polarization beam splitter (PBS) and a LCoS panel. The LCoS panel is formed on single-crystal silicon, and includes transistors arranged as a matrix, aluminium electrodes, liquid crystal and transparent electrodes, etc. The light source emits a light beam to the PBS and the PBS reflects the light beam to the LCoS panel. The transistors in the LCoS panel are configured to rotate the polarization of the light beam by applying an electric field on the liquid crystal. The aluminium electrodes reflect the light beam, and the light beam passes through the PBS to human eyes. However, the PBS may change the magnitude of the Sight beam in the fight path.

SUMMARY

Embodiments of the present invention provides a liquid crystal on silicon (LCoS) display. The LCoS Includes a polarization beam splitter (PBS), a light source, a LCoS panel and a gain control circuit. The PBS has a first side and a second side disposed opposite to the first side. The light source is disposed at the first side of the PBS. The LCoS is disposed at a third side of the PBS. The gain control circuit is coupled to the LCoS panel and receives brightness values. Each of the brightness values has a coordinate which is based on a coordinate axis extending from the first side of the PBS to the second side of the PBS. The brightness values include a first brightness value and a second brightness value. The first brightness value and the second brightness value belong to a same color. The coordinate of the first brightness value is less than the coordinate of the second brightness value. The gain control circuit determines gains according to the coordinates, and adjusting the brightness values according to the gains. The gain of the first brightness value is less than the gain of the second brightness value. After adjusting the brightness values, the gain control circuit transmits the brightness values to the liquid crystal on silicon panel.

In some embodiments, the brightness values include red brightness values, green brightness values and blue brightness values. The gain of the red brightness value having a first coordinate is greater than the gain of the green brightness value having the first coordinate. The gain of the green brightness value having the first coordinate is greater than the gain of the blue brightness value having the first coordinate.

In some embodiments, the gain control circuit further multiplies the red brightness values by a red compensation value, multiplies the green brightness values by a green compensation value, and multiplies the blue brightness values by a blue compensation value. The red compensation value, the green compensation value and the blue compensation value are different from each other.

In some embodiments, the red compensation value is less than the green compensation value, and the green compensation value is less than the blue compensation value.

In some embodiments, the gain control circuit substitutes the coordinates into a monotonically increasing function to obtain the gains.

In some embodiments, the gain control circuit performs the operation of adjusting the brightness values based on following equations (1), (2) and (3).

$$R_C(x) = \left(1 - (1 - R_G) \times \frac{H-x}{H}\right) \times R_i(x) \quad (1)$$

$$G_C(x) = \left(1 - (1 - G_G) \times \frac{H-x}{H}\right) \times G_i(x) \quad (2)$$

$$B_C(x) = \left(1 - (1 - B_G) \times \frac{H-x}{H}\right) \times B_i(x), \quad (3)$$

where x denotes the coordinate, $R_i(x)$ denotes a red brightness value having the coordinate x. $G_i(x)$ denotes a green brightness value having the coordinate x. $B_i(x)$ denotes a blue brightness value having the coordinate x. H is a real number. $R_G$, $G_G$, $B_G$ are real numbers ranged between 0 to 1. $R_C(x)$ denotes the adjusted red brightness value. $G_C(x)$ denotes the adjusted green brightness value. $B_C(x)$ denotes the adjusted blue brightness value.

In some embodiments, the gain control circuit further performs following equations (4), (5), and (6):

$$R_O(x) = \left(\frac{\min(R_G, G_G, B_G)}{R_G}\right) \times R_C(x) \quad (4)$$

$$G_O(x) = \left(\frac{\min(R_G, G_G, B_G)}{G_G}\right) \times G_C(x) \quad (5)$$

$$B_O(x) = \left(\frac{\min(R_G, G_G, B_G)}{B_G}\right) \times B_C(x), \quad (6)$$

$R_O(x)$ denotes the red brightness value transmitted to the liquid crystal on silicon panel. $G_O(x)$ denotes the green brightness value transmitted to the liquid crystal on silicon panel. $B_O(x)$ denotes the blue brightness value transmitted to the liquid crystal on silicon panel.

Embodiments of the present invention provide a brightness adjusting method for the LCoS display. The method includes operations/steps performed by the gain control circuit.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention.

The using of "first", "second", "third", etc. in the specification should be understood for identifying units or data described by the same terminology, but are not referred to particular order or sequence.

Figure 1:
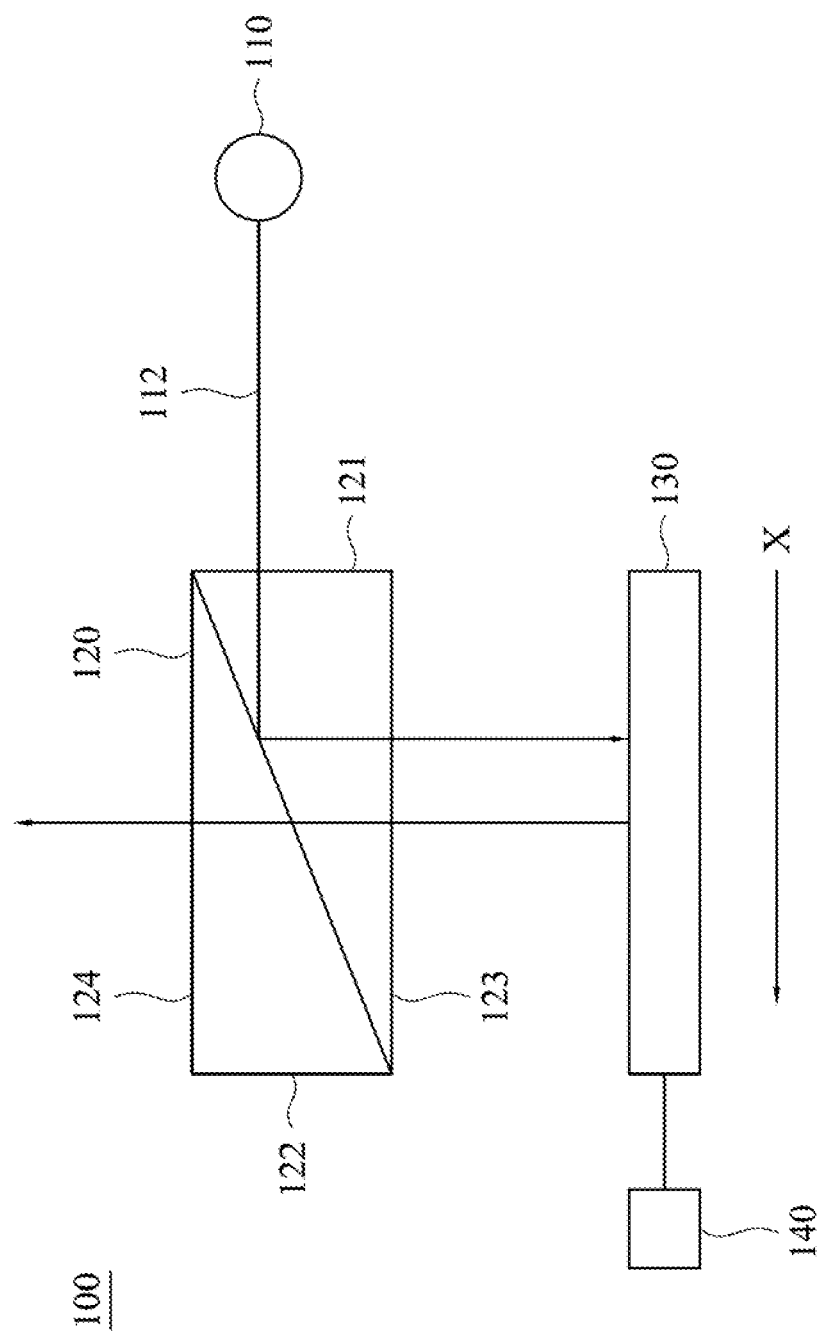
FIG. 1 is a schematic diagram illustrating part of a liquid crystal on silicon display according to an embodiment.

FIG. 1 is a schematic diagram illustrating part of a liquid crystal on silicon display according to an embodiment. Referring to FIG. 1, a liquid crystal on silicon (LCoS) display 100 includes a light source 110, a polarization beam splitter (PBS) 120 and a LCoS panel 130. It is noted that FIG. 1 is not drawn to actual size, and not all components of the LCoS display 100 are illustrated for simplicity.

The light source 110 is configured to provide a fight beam 112. For example, the light source 110 may be a high pressure mercury lamp, a metal halide lamp, a light-emitting diode (LED) or other suitable light sources. In some embodiments, the light beam 112 is white light, and the LCoS display 100 further includes one or more color filters, and the LCoS display 100 generates red light, green light and blue light by a time-division way. In other embodiments, the paths for the red light, the green light and the blue light are separated from each other, and the LCoS display 100 includes three LCoS panels 130 to deal with the red light the green light and the blue light respectively, and then the red light, the green light and the blue fight are combined and emitted by the LCoS display 100. In other words, the light beam 112 may be white light, red light, green light or blue fight, and the color of the light beam 112 is not limited in the invention.

The PBS 120 is configured to separate the un-polarized light beam 112 into a P-polarized light beam and a S-polarized light beam, and one of which is reflected to the LCoS panel 130.

The LCoS panel 130 is configured to polarize the incident light beam 112 and reflects the tight beam 112 to the PBS 120, and then the light beam 112 is projected on a screen (not shown). For example, LCoS panel 130 may include glass, a silicon substrate, transistors, liquid crystal, transparent electrodes, aluminium electrodes, etc. However, people in the art should be able to adopt any types of liquid crystal on silicon panel, and how the LCoS panel 130 is implemented is not limited in the invention.

The PBS 120 has a first side 121 a second side 122, a third side 123 and a fourth side 124. The first side 121 is opposite to the second side 122, and the third side 123 is opposite to the fourth side 124. The light source 110 is disposed at the first side 121, and the LCoS panel 130 is disposed at the third side 123. The first side 121, the third side 123 and the fourth side 124 are disposed in the path of the light beam 112, but the second side 122 is not in the path of the light beam 112. To be specific, the light beam 112 enters the PBS 120 from the first side 121, and is reflected and emitted out from the third side 123. The LCoS panel 130 reflects the light beam 112 and then the light beam 112 enters the PBS 120 from the third side 123. At the end, the fight beam 112 is emitted out from the fourth side 124. From another aspect, the first side 121 is located between the tight source 110 and the second side 122.

The gain control circuit 140 is coupled to the LCoS panel 130, receives multiple brightness values, and adjusts the brightness values. The adjusted brightness values are transmitted, as forms of voltages, to sources of the transistors in the LCoS panel 130 in order to determine electric fields applied on the liquid crystal. Each brightness value has a coordinate which is based on a coordinate axis X extending from the first side 121 of the PBS 120 to the second side 122. That is, the smaller the coordinates are, the closer the corresponding positions on the PBS 120 are to the first side 121. In other words, the smaller the coordinates are, the closer the corresponding transistors are to the right-hand side of the LCoS panel 130. However, the origin and the unit length of the coordinate system are not limited in the invention.

In the embodiment of FIG. 1, the gain control circuit 140 is disposed outside the LCoS panel 130 (e.g. in a time controller (not shown)). However, in some embodiments, the gain control circuit 140 may be disposed inside the LCoS panel 130. Where the gain control circuit 140 is disposed is not limited in the invention.

Figure 2:
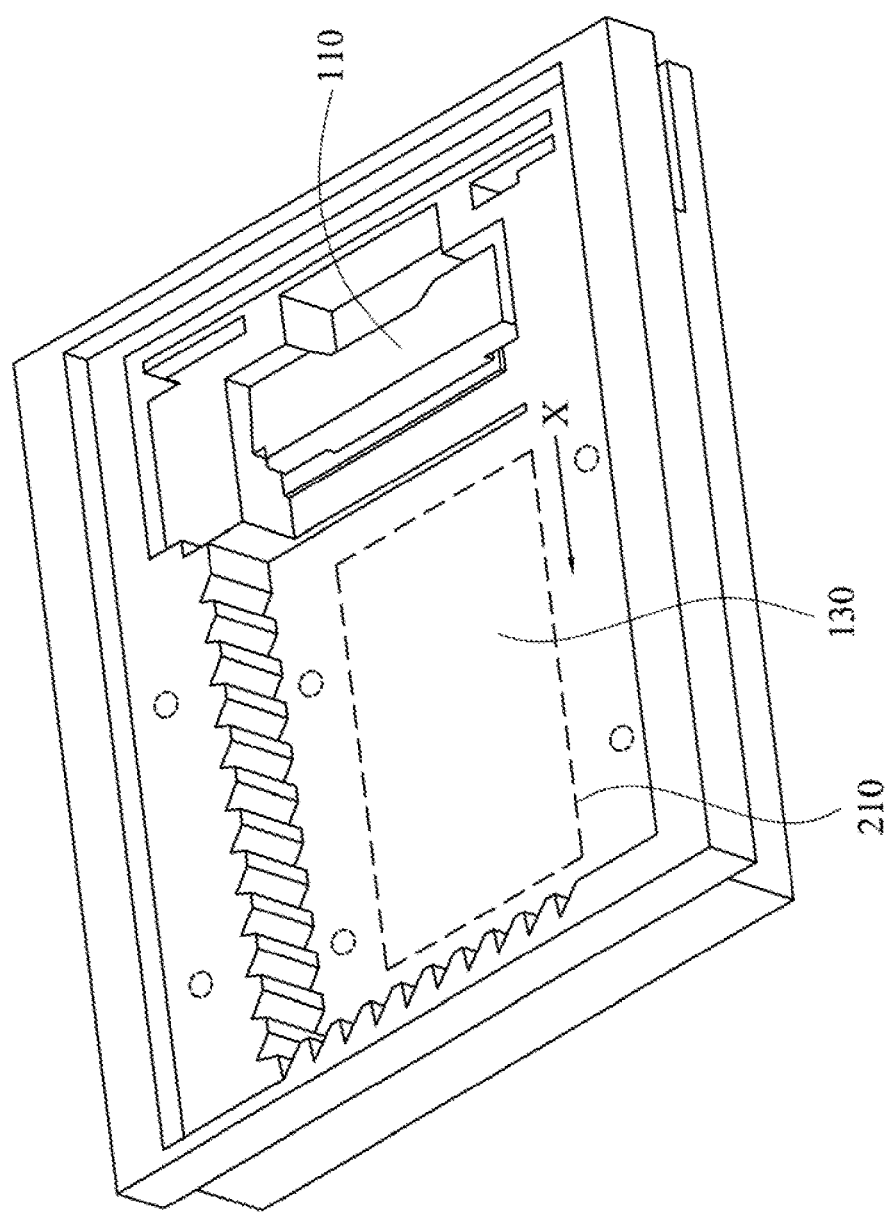
FIG. 2 is a diagram illustrating components disposition of the LCoS display 100 according to an embodiment.

FIG. 2 is a diagram illustrating components disposition of the LCoS display 100 according to an embodiment. In the embodiment of FIG. 2, the light source 110 is implemented as a stripe LED. The LCoS panel 130 has a display area 210, in which multiple transistors are disposed. The light beam emitted by the light source 110 is reflected to the display area 210. The coordinate axis X is extending from a side close to the light source 110 to another side far from the light source 110. However, FIG. 2 is just illustrative, and the location of each component of the LCoS display 100 is not limited in the invention.

Figure 3:
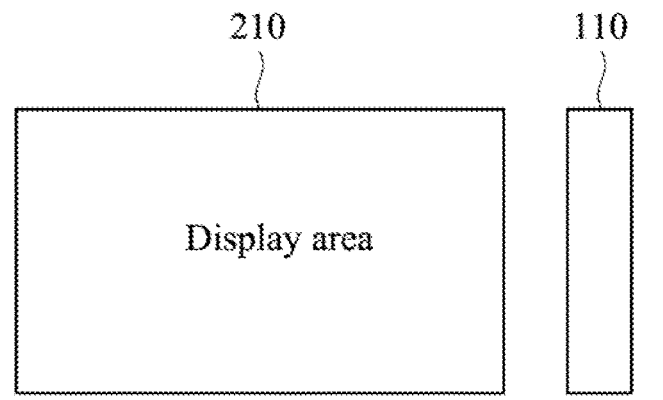
FIG. 3 is a diagram illustrating the determination of the gains according to the coordinates according to an embodiment.
Figure 3:
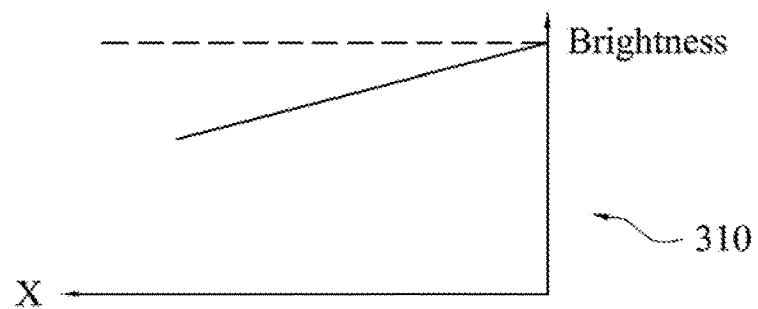
Figure 3:
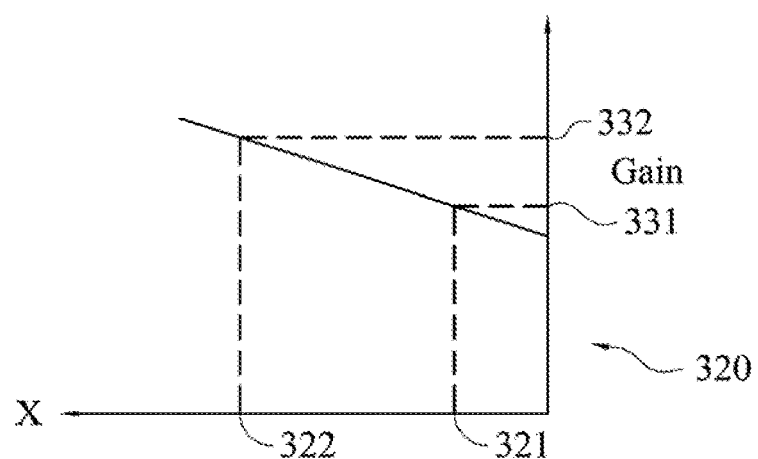

FIG. 3 is a diagram illustrating the determination of the gains according to the coordinates according to an embodiment. Referring to FIG. 3, as mentioned, the light beam from the light source 110 is reflected to the display area 210. However, the further the light beam is away from the light source 110, the greater the attenuation of the light beam's brightness. As shown in a diagram 310, small coordinates on the coordinate axis X leads to less attenuation of the brightness, and large coordinates leads to more attenuation. This situation will cause brightness unbalance between left-hand side and right-hand-side of an image. Therefore, in the embodiment, the gain control circuit 140 calculates gains according to the coordinate of each brightness value, and adjusts the brightness values according to the gains. As shown in a diagram 320, a brightness value having small coordinate corresponds to a small gain, and a brightness value having large coordinate corresponds to a large gain. For example, assume a certain first brightness value has a coordinate 321, and a certain second brightness value has a coordinate 322. The coordinate 321 is less than the coordinate 322, and the first brightness value and the second brightness value belong to the same color. The gain control circuit 140 sets the first brightness value to have a gain 331, and sets the second brightness value to have a gain 332 which is greater than the gain 331. In other words, the coordinates are directly proportional to the gains. The gain control circuit 140 may adjust the first brightness value and the second brightness value according to the gain 331 and 332 respectively. For example, the gains 331 and 332 are real numbers ranged from 0 to 1. The gain control circuit 140 may multiplies the first brightness value by the gain 331, and multiplies the second brightness value by the gain 332. As a result, the brightness unbalance between the left-hand side and the right-hand-side of the image is compensated. It is noted that the gains in the diagram 320 are just examples. In other embodiments, the gain control circuit 140 may set any monotonically increasing function, and substitute the coordinates into the monotonically increasing function to obtain the gains.

Figure 4:
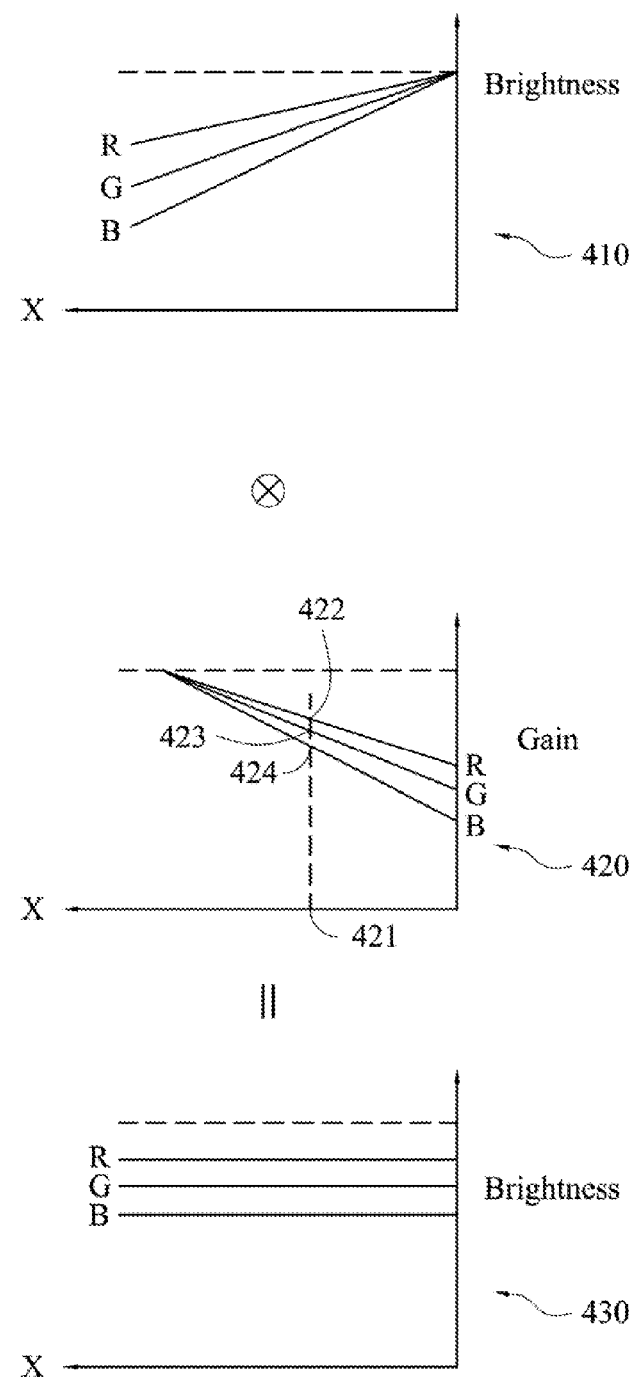
FIG. 4 is a schematic diagram illustrating the generation of the gains for different colors.

The brightness values received by the gain control circuit 140 may include red brightness values, green brightness values and blue brightness values. However, different colors of the light beams may cause different extent of attenuation. Therefore, different gains may be generated for different colors of the brightness values. Referring to FIG. 4, FIG. 4 is a schematic diagram illustrating the generation of the gains for different colors. As shown in a diagram 410, red brightness values R are attenuated more than green brightness values G are, and the green brightness values G are attenuated more than blue brightness values B. Therefore, for a certain coordinate 421 (also referred to a first coordinate) in a diagram 420, a gain 422 of the red brightness value is greater than a gain 423 of the green brightness value having the same coordinate 421. The gain 423 of the green brightness value is greater than the gain 424 of the blue brightness value having the same coordinate 421. The brightness in the diagram 410 times the gains in the diagram equals to adjusted brightness values in a diagram 430. In the diagram 430, the brightness values are consistent along the coordinates for each color, but different colors have different brightness. This situation makes the color of the image shift. Therefore, in some embodiments, after the brightness values are adjusted according to the gains, the gain control circuit 140 multiplies all the red brightness values by a red compensation value, multiplies all the green brightness values by a green compensation value, and multiplies all the blue brightness values by a blue compensation value. The red compensation value is less than the green compensation value, and the green compensation value is less than the blue compensation value. After the multiplication, the brightness values are consistent among different colors.

For example, the operation of determining the gains and the operation of adjusting the brightness values are performed based on following equations (1), (2), and (3).

$$R_C(x) = \left(1 - (1 - R_G) \times \frac{H - x}{H}\right) \times R_i(x) \quad (1)$$

$$G_C(x) = \left(1 - (1 - G_G) \times \frac{H - x}{H}\right) \times G_i(x) \quad (2)$$

$$B_C(x) = \left(1 - (1 - B_G) \times \frac{H - x}{H}\right) \times B_i(x) \quad (3)$$

$R_i(x)$ denotes the red brightness value having the coordinate x. $G_i(x)$ denotes the green brightness value having the coordinate x. $B_i(x)$ denotes the blue brightness value having the coordinate x, H is a real number representing the width or the height of the image, $R_G$, $G_G$, $B_G$ are real numbers ranged between 0 to 1, and $R_G > G_G > B_G$. $R_C(x)$ denotes the adjusted red brightness value. $G_C(x)$ denotes the adjusted green brightness value. $B_C(x)$ denotes the adjusted blue brightness value. The equations (1), (2), and (3) are corresponding to the three lines in the diagram 420.

Next, the gain control circuit 140 may further perform following equations (4), (5), and (6).

$$R_O(x) = \left(\frac{\min(R_G, G_G, B_G)}{R_G}\right) \times R_C(x) \quad (4)$$

$$G_O(x) = \left(\frac{\min(R_G, G_G, B_G)}{G_G}\right) \times G_C(x) \quad (5)$$

$$B_O(x) = \left(\frac{\min(R_G, G_G, B_G)}{B_G}\right) \times B_C(x) \quad (6)$$

$R_O(x)$ denotes the red brightness value transmitted to the LCoS panel 130. $G_O(x)$ denotes the green brightness value transmitted to the LCoS panel 130. $B_O(x)$ denotes the blue brightness value transmitted to the LCoS panel 130. $\min(R_G, G_G, B_G)/R_G$ is the said red compensation value, $\min(R_G, G_G, B_G)/G_G$ is the said green compensation value, and $\min(R_G, G_G, B_G)/B_G$ is the said blue compensation value.

Figure 5:
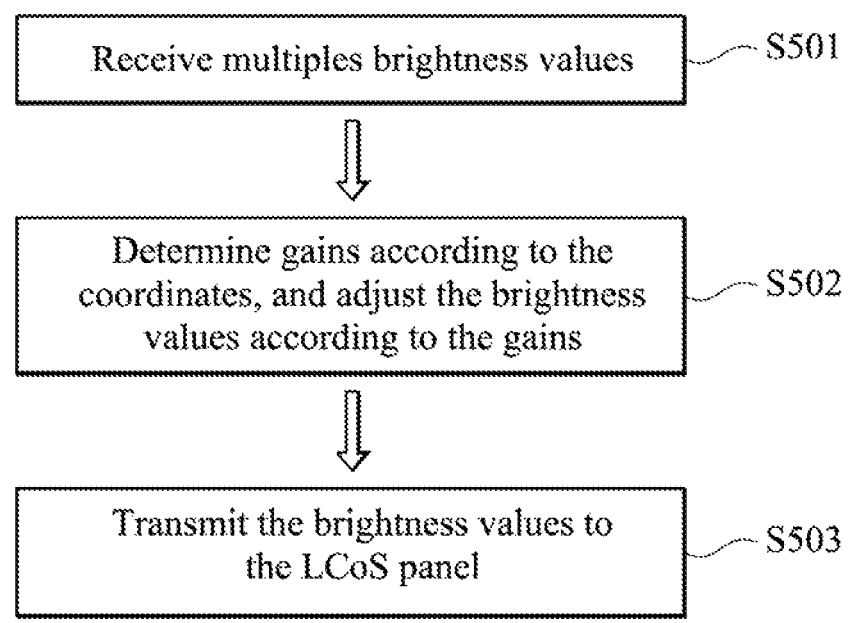
FIG. 5 is a flow char of a brightness adjusting method for a liquid crystal on silicon display according to an embodiment.

FIG. 5 is a flow chart of a brightness adjusting method for a liquid crystal on silicon display according to an embodiment. Referring to FIG. 5, in a step S501, multiples brightness values are received. Each of the brightness values has a coordinate which is based on a coordinate axis extending from the first side of the BPS to the second side of the BPS. The brightness values includes a first brightness value and a second brightness value. The first brightness value and the second brightness value belong to a same color. The coordinate of the first brightness value is less than the coordinate of the second brightness value. In a step S502, gains are determined according to the coordinates, and the brightness values are adjusted according to the gains, in which the gain of the first brightness value is less than the gain of the second brightness value. In a step S503, the brightness values are transmitted to the LCoS panel. However, each step in FIG. 5 has been described in detail above, and therefore the description will not be repeated. It is noted that each step in FIG. 5 may be implemented as program codes or circuits, and the invention is not limited thereto. In addition, the method of FIG. 5 may be performed with the aforementioned embodiments or performed independently. In other words, other steps may be inserted between the steps in FIG. 5.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid crystal on silicon display, comprising:
   a polarization beam splitter, having a first side and a second side disposed opposite to the first side;
   a light source, disposed at the first side of the polarization beam splitter;
   a liquid crystal on silicon panel, disposed at a third side of the polarization beam splitter; and
   a gain control circuit, coupled to the liquid crystal on silicon panel and receiving a plurality of brightness values, wherein each of the brightness values has a coordinate which is based on a coordinate axis extending from the first side of the polarization beam splitter to the second side of the polarization beam splitter, the brightness values comprise a first brightness value and a second brightness value, the first brightness value and the second brightness value belong to a same color, the coordinate of the first brightness value is less than the coordinate of the second brightness value, wherein the gain control circuit determines a plurality of gains according to the coordinates, and adjusts the brightness values according to the gains, wherein the gain of the first brightness value is less than the gain of the second brightness value, wherein after adjusting the brightness values, the gain control circuit transmits the brightness values to the liquid crystal on silicon panel, wherein the gain control circuit performs the operation of adjusting the brightness values based on following equations (1), (2) and (3):

$$R_C(x) = \left(1 - (1 - R_G) \times \frac{H - x}{H}\right) \times R_i(x) \quad (1)$$

$$G_C(x) = \left(1 - (1 - G_G) \times \frac{H - x}{H}\right) \times G_i(x) \quad (2)$$

$$B_C(x) = \left(1 - (1 - B_G) \times \frac{H - x}{H}\right) \times B_i(x) \quad (3)$$

wherein x denotes the coordinate, $R_i(x)$ denotes a red brightness value having the coordinate x, $G_i(x)$ denotes a green brightness value having the coordinate x, $B_i(x)$ denotes a blue brightness value having the coordinate x, H is a real number, $R_G$, $G_G$, $B_G$ are real numbers ranged between 0 to 1, $R_C(x)$ denotes the adjusted red brightness value, $G_C(x)$ denotes the adjusted green brightness value, and $B_C(x)$ denotes the adjusted blue brightness value.

2. The liquid crystal on silicon display of claim 1, wherein the gain control circuit further performs following equations (4), (5), and (6):

$$R_O(x) = \left(\frac{\min(R_G, G_G, B_G)}{R_G}\right) \times R_C(x) \quad (4)$$

$$G_O(x) = \left(\frac{\min(R_G, G_G, B_G)}{G_G}\right) \times G_C(x) \quad (5)$$

$$B_O(x) = \left(\frac{\min(R_G, G_G, B_G)}{B_G}\right) \times B_C(x) \quad (6)$$

wherein $R_O(x)$ denotes the red brightness value transmitted to the liquid crystal on silicon panel, $G_O(x)$ denotes the green brightness value transmitted to the liquid crystal on silicon panel, $B_O(x)$ denotes the blue brightness value transmitted to the liquid crystal on silicon panel.

3. A brightness adjusting method for a liquid crystal on silicon display, wherein the liquid crystal on silicon display comprises a polarization beam splitter, a light source and a liquid crystal on silicon panel having a first side and a second side opposite to the first side, wherein the light source is disposed at the first side of the polarization beam splitter, and the brightness adjusting method comprises:

receiving a plurality of brightness values, wherein each of the brightness values has a coordinate which is based on a coordinate axis extending from the first side of the polarization beam splitter to the second side of the polarization beam splitter, the brightness values comprise a first brightness value and a second brightness value, the first brightness value and the second brightness value belong to a same color, the coordinate of the first brightness value is less than the coordinate of the second brightness value;

determining a plurality of gains according to the coordinates, and adjusting the brightness values according to the gains, wherein the gain of the first brightness value is less than the gain of the second brightness value; and transmitting the brightness values to the liquid crystal on silicon panel after adjusting the brightness values, wherein the step of adjusting the brightness values is performed based on following equations (1), (2) and (3):

$$R_C(x) = \left(1 - (1 - R_G) \times \frac{H - x}{H}\right) \times R_i(x) \quad (1)$$

$$G_C(x) = \left(1 - (1 - G_G) \times \frac{H - x}{H}\right) \times G_i(x) \quad (2)$$

$$B_C(x) = \left(1 - (1 - B_G) \times \frac{H - x}{H}\right) \times B_i(x) \quad (3)$$

wherein x denotes the coordinate, $R_i(x)$ denotes a red brightness value having the coordinate x, $G_i(x)$ denotes a green brightness value having the coordinate x, $B_i(x)$ denotes a blue brightness value having the coordinate x, H is a real number, $R_G$, $G_G$, $B_G$ are real numbers ranged between 0 to 1, $R_C(x)$ denotes the adjusted red brightness value, $G_C(x)$ denotes the adjusted green brightness value, and $B_C(x)$ denotes the adjusted blue brightness value.

4. The brightness adjusting method of claim 3, further comprising:

performing following equations (4), (5) and (6):

$$R_O(x) = \left(\frac{\min(R_G, G_G, B_G)}{R_G}\right) \times R_C(x) \quad (4)$$

$$G_O(x) = \left(\frac{\min(R_G, G_G, B_G)}{G_G}\right) \times G_C(x) \quad (5)$$

$$B_O(x) = \left(\frac{\min(R_G, G_G, B_G)}{B_G}\right) \times B_C(x) \quad (6)$$

wherein $R_O(x)$ denotes the red brightness value transmitted to the liquid crystal on silicon panel, $G_O(x)$ denotes the green brightness value transmitted to the liquid crystal on silicon panel, $B_O(x)$ denotes the blue brightness value transmitted to the liquid crystal on silicon panel.

* * * * *